UNITED STATES PATENT OFFICE.

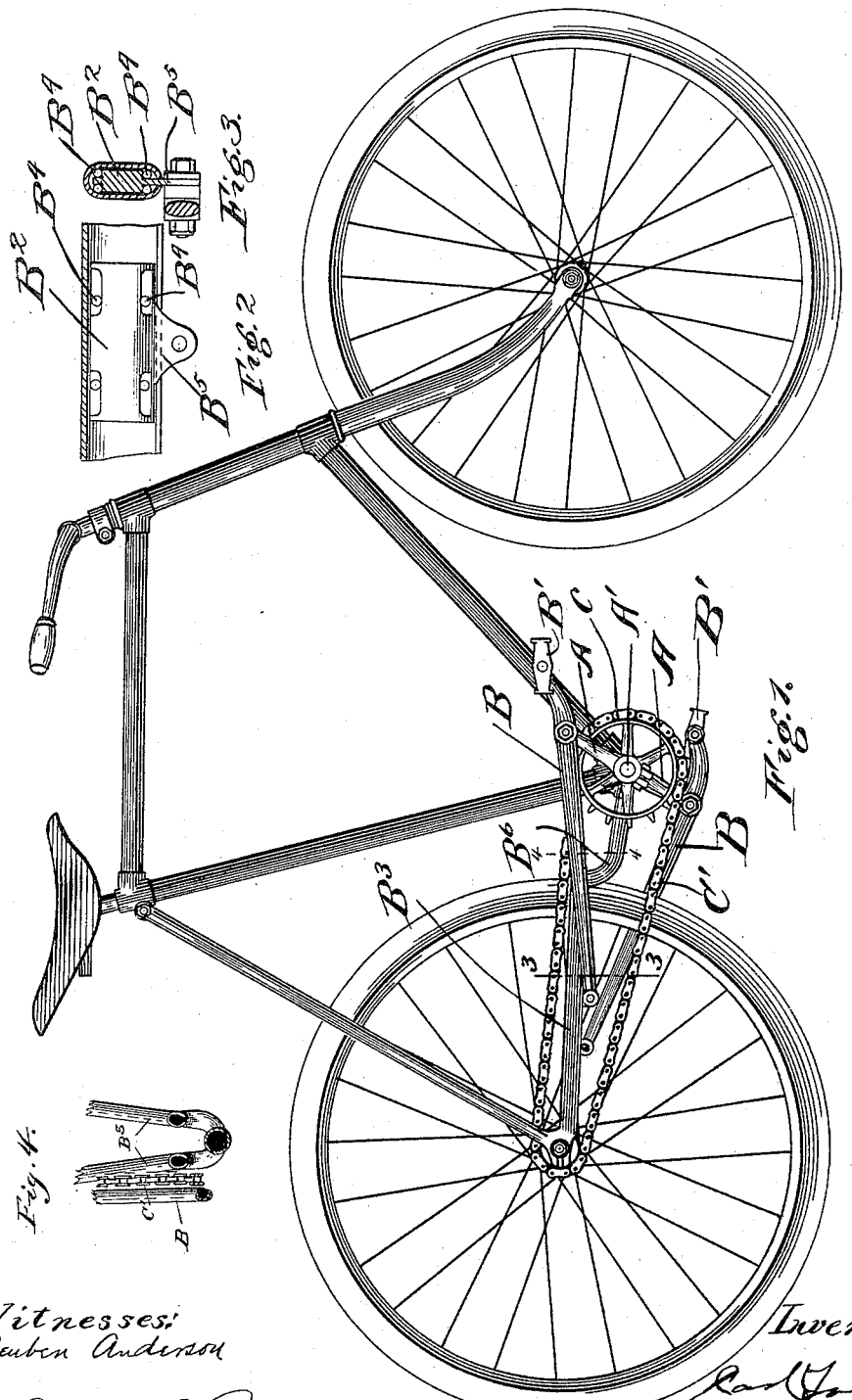

CARL YOUNG, OF CHICAGO, ILLINOIS.

BICYCLE.

SPECIFICATION forming part of Letters Patent No. 584,808, dated June 22, 1897.

Application filed February 10, 1896. Serial No. 578,726. (No model.)

*To all whom it may concern:*

Be it known that I, CARL YOUNG, a citizen of the United States, residing at Chicago, in the county of Cook and State of Illinois, have invented certain Improvements in Bicycles, of which the following is a specification.

My invention relates to bicycles, and has for its object to provide a new and improved power-transmitting mechanism for the same.
My invention is illustrated in the accompanying drawings, wherein—

Figure 1 is a side elevation of a bicycle embodying my invention. Fig. 2 is a longitudinal section of part of one of the arms of the rear fork. Fig. 3 is a section on line 3 3, Fig. 1, with parts omitted. Fig. 4 is a section on line 4 4, Fig. 1, with parts omitted.

Like letters refer to like parts throughout the several figures.

In the operation of bicycles the power is usually applied by means of the foot of the rider. The bicycle-wheel is operatively connected with a crank-arm which is rotated by means of the foot of the rider. The power developed of course depends upon the length of this crank-arm. In the operation of this crank-arm the foot of the rider travels around with it. The length of the crank-arm cannot be advantageously increased beyond a certain length. The distance through which the rider's foot can be advantageously moved is limited. In the operation of this crank power is only applied through a small portion of its revolution, and hence the power developed depends upon the length of the crank-arm during this movement, the length of said arm during the remainder of the movement being immaterial.

The object of my invention is to construct mechanism whereby the crank-arm may be lengthened during the operative part of the stroke and to avoid the evil of necessitating a greater movement of the foot of the rider due to this length by shortening such crank-arm during the remainder of the stroke.

Referring to Fig. 1, the crank-arms A A of the bicycle are rigidly connected with the levers B B, to which the pedals B' B' are connected. The rear end of the arms B are each pivotally connected to a sliding piece or crosshead $B^2$, adapted to be reciprocated within the hollow arms of the rear fork $B^3$. This connection and the construction of the crosshead $B^2$ is illustrated in Figs. 2 and 3. It is evident that this cross-head may be made in any convenient manner, but, as here illustrated, it works in guides in the rear fork and is provided with the ball-bearings $B^4$ $B^4$. A lug $B^5$, connected with said cross-head, projects through a slot in the lower side of each arm of the rear fork, and the arms B B are pivotally connected thereto. The rear fork at the point where the two arms come together is bent downwardly, as shown at $B^6$, and the ends of the two arms are left open, so that the cross-heads $B^2$ may be inserted therein.

It will be seen that by this construction the arms B B and the cross-heads $B^2$ $B^2$ are reciprocated as the pedals are revolved. When the crank is at the operative part of its stroke, its effective length is equal to the effective length of the crank-arm A plus the distance from the pedal B' to the point where said crankarm is pivoted to the arm B. As the crank continues in its rotation it will be seen that the effective length of the crank-arm during the remainder of the stroke will be equal to the difference between the effective length of the crank-arm and the distance between the pedal and the point to which said crank-arm is connected to the arm B. It will therefore be seen that I obtain an increased length of crank-arm during the operative part of the stroke and a decreased length of crank-arm during the inoperative part of the stroke, and hence I obtain an increase of power without increasing the distance through which the foot of the operator travels. The sprocket-wheel C is connected with the shaft A' and is connected by means of the chain C' to the rear wheel in the ordinary manner.

The hollow branches of the rear fork are preferably left open at the end, so that the cross-head may be inserted therein. This end may be made in any desirable manner, as shown in Fig. 4. The end is provided with a cap, so as to prevent foreign material from entering the tube.

The use and operation of my invention have been clearly set forth and hence will need but little further description.

In the operation of the device shown in Fig. 1 the arms B B and cross-heads $B^2$ $B^2$ are reciprocated by the revolution of the pedals, and since said cross-heads are provided with ball-bearings there will be very little additional friction. The parts may also be so constructed that there will be very little addition to the weight of the bicycle.

I claim—

The combination in a safety-bicycle of the wheels and frame, the two branches of the rear fork of said frame being hollow and being provided on the lower sides with slots, a cross-head contained within each of the hollow branches of the rear fork, said rear fork being bent at the point where the two branches come together, so as to be out of line with said branches, the ends of said branches being left open so that the cross-heads may be inserted therein, said cross-heads having projecting parts thereon extending through the slots on the lower sides of the branches of said rear fork, an arm connected with each of said cross-heads, each arm having a pedal connected thereto, a pedal-shaft rotatably mounted in said frame, two cranks rigidly connected with said shaft and a pivotal connection between said cranks and the arms carrying the pedals substantially as described.

CARL YOUNG.

Witnesses:
FRANCIS W. PARKER,
E. C. BOWLING.